United States Patent [19]

Tracy et al.

[11] Patent Number: 4,786,670

[45] Date of Patent: Nov. 22, 1988

[54] COMPRESSIBLE NON-ASBESTOS HIGH-TEMPERATURE SHEET MATERIAL USABLE FOR GASKETS

[75] Inventors: Douglas Tracy, Dayville; Frank W. Major, Bolton, both of Conn.

[73] Assignee: Lydall, Inc., Manchester, Conn.

[21] Appl. No.: 1,704

[22] Filed: Jan. 9, 1987

[51] Int. Cl.$^4$ .................... C08L 89/00; C08K 3/10; C08K 3/34
[52] U.S. Cl. ....................... 524/34; 524/35; 524/401; 524/436; 524/443; 524/445; 524/448; 524/449; 524/492; 524/494; 277/235 B; 277/DIG. 6; 428/131; 428/171; 428/233; 428/243
[58] Field of Search .............. 524/34, 35, 401, 436, 524/443, 445, 448, 449, 492, 494; 277/235 B, DIG. 6; 428/131, 171, 233, 241, 242, 243

[56] References Cited

U.S. PATENT DOCUMENTS

| | | | |
|---|---|---|---|
| 4,317,575 | 3/1982 | Cavicchio | 524/2 |
| 4,330,442 | 5/1982 | Lindeman et al. | 524/16 |
| 4,443,517 | 4/1984 | Shah | 428/280 |

*Primary Examiner*—Morton Foelak
*Assistant Examiner*—Nathan M. Nutter
*Attorney, Agent, or Firm*—McCormick, Paulding and Huber

[57] ABSTRACT

A non-asbestos compressible sheet material usable for high-temperature gaskets preferably containing 10–50% by weight of an inorganic fibrous material, 10–90% by weight of an inorganic filler material, 4–30% by weight of an organic elastomeric binder, 2–10% by weight of an inorganic silicate binder and 1.0–10% of an organic fibrous material. The sheet material of the present invention may be manufactured on standard paper-making machinery.

12 Claims, 1 Drawing Sheet

COMPRESSIBLE NON-ASBESTOS HIGH-TEMPERATURE SHEET MATERIAL USABLE FOR GASKETS

BACKGROUND OF THE INVENTION

1. Field of the Invention

This invention relates to a compressible sheet material usable for gaskets and, more particularly, to a non-asbestos sheet material for high-temperature gasketing applications.

2. Description of the Prior Art

In general, sheet gasket materials comprise sheets of uniform thickness often made of fibers held together by a suitable bonding agent. Where a gasket is exposed to a high-temperature environment, such as that in which a cylinder head gasket for an internal combustion engine normally operates, the sheet material comprising the gasket must exhibit not only superior heat resistance and sealability properties but also must have sufficient compressibility, resiliency, creep resistance and tensile strength.

In the past, all sheet materials for high-temperature gaskets have contained asbestos fibers. Asbestos fibers offer several advantages; they impart to the sheet material the desired performance and mechanical properties and are both inexpensive and readily available. More recently, however, concern about the health hazards associated with exposure to asbestos fibers has lead to the development of some non-asbestos sheet gasket materials.

These non-asbestos sheet gasket materials usually comprise a fiber component including inorganic and/or organic fibrous materials, an inorganic filler component and an organic binder. Sheet materials of this general composition are disclosed, for example, in U.S. Pat. Nos. 4,529,663, 4,529,653, 4,387,178 and 4,317,575. Unfortunately, most or all of the presently known non-asbestos sheet materials have proven to be not entirely satisfactory for use as high-temperature gaskets in many applicatons. That is, one or more defects, such as poor temperature tolerance due to burn-out of organic materials at relaively low temperatures, low tensile strength, lack of resiliency and insufficient cohesive strength to permit fabrication, plague the prior art non-asbestos materials.

Accordingly, an important objective of this invention is to provide a non-asbestos sheet material which fulfills the performance and mechanical requirements demanded of high-temperature gaskets.

It is a further objective of this invention to provide a non-asbestos sheet material suitable for use as a high-temperature gasket comprising inexpensive and readily available components.

It is a still further object of this invention to provide a non-asbestos sheet material suitable for use as a high-temperature gasket which can be manufactured by ordinary paper-making processes.

SUMMARY OF THE INVENTION

The present invention overcomes the deficiencies of the prior art and meets the objectives set out above by providing a compressible, non-asbestos sheet material usable for high-temperature gaskets exposed to temperatures of 500° to 1200° F.

In accordance with the present invention, a gasket is formed from a sheet material comprising an inorganic fibrous material, an inorganic filler material, an organic elastomeric binder, an inorganic silicate binder and an organic fibrous material. The sheet material may be manufactured on conventional paper-making equipment.

DESCRIPTION OF THE PREFERRED EMBODIMENTS

Figure 1:
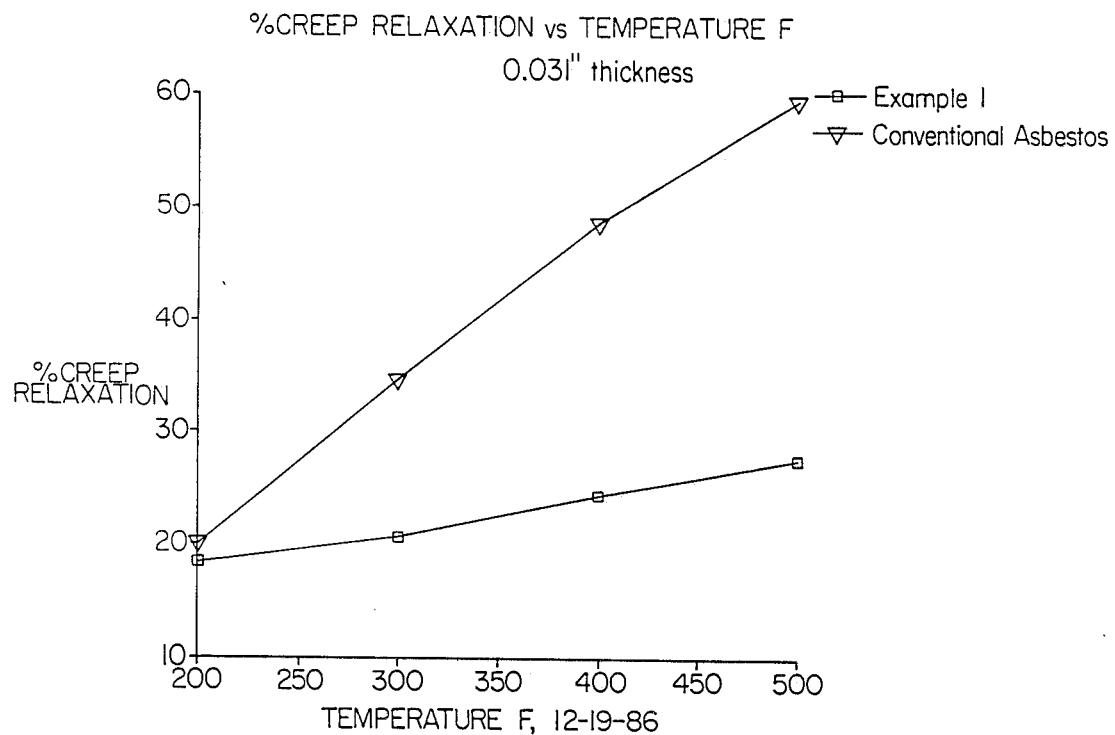
FIG. 1 is a graph showing creep relaxation vs temperature of the Example 1 material and a prior art asbestos gasket material.

The present invention is a sheet material designed for high-temperature gasketing applications. The sheet material's low organic substance content and its unique binder system enable it to function effectively as a gasket material at temperatures of 500° to 1200° F.

The present invention provides a sheet material comprising: 10–50% by weight of inorganic fibrous material, 10–90% by weight of inorganic filler material, 4–30% by weight of an organic elastomeric binder, 2–10% by weight of an inorganic silicate binder and 1.8–10% by weight of an organic fibrous material.

The chart below lists both the permissible and preferred and preferred weight percentage ranges of the above-identified constituents.

| CONSTITUENTS | DRY WEIGHT PERCENTAGE | |
|---|---|---|
| | PERISSIBLE | PREFERRED |
| INORGANIC FIBERS | 10–50 | 18–31 |
| INORGANIC FILLERS | 10–90 | 27–50 |
| ORGANIC BINDER | 4–30 | 5–19 |
| SILICATE BINDER | 2–10 | 3–8 |
| ORGANIC FIBERS | 1.0–10 | 1.0–6.0 |

The preferred inorganic fibrous materials are glassy wool including mineral wool, glass fiber and ceramic fiber. Of these, mineral wool provides the most attractive combination of heat resistance and low cost.

While glassy wools such as mineral wool contribute excellent heat resistance and reinforcing properties to the sheet material, they do not exhibit the textile-like properties characteristic of asbestos fibers. Therefore, it is preferable to include an organic fibrous material in the formulation of the present invention. The organic material is preferably a cellulosic fiber, aramid fiber or other synthetic fibers or mixtures thereof. The organic fibers permit conventional paper-making machinery to be used in the manufacture of the sheet material and also impart wet and dry strength and flexibility to the sheet material.

Fillers are added to the formulation not only to provide bulk and reduce costs but also to enhance the sheet material's physical and performance properties. The preferred fillers include diatomaceous earth, clay, mica, vermiculite, barytes, and mixtures thereof.

The binder system of the present invention has been specifically developed to tolerate the elevated temperatures to which cylinder head gaskets and the like are exposed. Prior art sheet materials have utilized binders which were predominantly organic in nature. While such binders operate effectively at relatively low temperatures, they are quickly destroyed at temperatures exceeding about 500° F. Applicants have eliminated the problem of high-temperature intolerance which plagues prior art binders and have thus been able to produce a sheet material that remains operable to temperatures exceeding 1200° F.

The binder system of the present invention contains both an organic and an inorganic component. The organic component exerts its binding effect at relatively low temperatures. As the temperature to which the sheet material is exposed rises above 500° F., the organic component burns out, and the inorganic component becomes solely responsible for producing the binding effect. The organic component is an elastomeric binder, preferrably in latex form, and includes such materials as isoprene rubber, styrene-butadiene rubber, nitrile rubber, chloroprene rubber, silicone rubber, acrylic rubber and fluorinated resins. The inorganic component of the binder is a silicate, preferably sodium silicate or silica in colloidal form.

In addition to the above-disclosed constituents, the present invention includes small amounts of what may be called processing aids. Processing aids are usually present in amounts ranging from 0.25-3.0% on a dry weight basis. These materials include antioxidants, pigments, curing agents, dispersing agents, pH adjustors, retention aids and drainage aids. The retention and drainage aids are cationic and anionic polyelectrolytes selected from the polyamide and polyacylamide families.

Standard paper-making equipment such as a four-driner machine or cylinder machine is used to form the sheet material of the present invention. A typical process involves adding the organic fibers, the inorganic fillers and the silicate binder to a pulper and dispersing them in water. After these constituents are thoroughly mixed, the inorganic fiber is added to the slurry. The entire slurry is then discharged to the blend chest of the papermaking machine. At the blend chest the slurry is further diluted with fresh water. A previously diluted latex binder is then added to the slurry and mixed in. This is followed by a dilute solution of a cationic polyelectrolyte. The polyelectrolyte is mixed in until the slurry has sufficiently flocculated the fiber/filler matrix. The mixture is then transferred to the papermaking machine. At the machine flow box a dilute solution of a cationic polyelectrolyte and/or a dilute solution of an anionic polyelectrolyte are added to insure good sheet formation and drainage. The sheet is then formed on the wet machine. After the sheet is formed and dried, it is calendered to the desired thickness and density.

The method of manufacture and the composition for four specific embodiments of the present invention are given below.

EXAMPLE I

This example illustrates the preparation of a non-asbestos compressible sheet material, usable for head gaskets, of the following composition:

| MATERIAL | % | 60# BATCH LBS. |
| --- | --- | --- |
| Cellulose Fiber | 0.88 | 0.53 |
| Synthetic Fiber | 1.76 | 1.06 |
| Diatomaceous Earth | 44.1 | 26.5 |
| Phenolic Resin | 3.78 | 2.27 |
| Synthetic Dispersant | 0.0125 | 0.075 |
| Zinc Oxide | 0.35 | 0.21 |
| Sodium Silicate | 6.98 | 4.19 |
| Mineral Wool | 27.72 | 13.63 |
| Carbon Black | 0.38 | 0.23 |

| MATERIAL | % | 60# BATCH LBS. |
| --- | --- | --- |
| Antioxidant | 0.30 | 0.18 |
| Pigment Color (Organic) | 0.126 | 0.076 |
| Anionic Polyelectrolyte | 0.05 | 0.03 |
| Cationic Polyelectrolyte | 3.02 | 1.81 |
| Nitrile Latex | 9.42 | 5.65 |
| Alum | 1.11 | 0.66 |

(A) At Pulper
1. Add the following ingredients:
   Fresh Water—100 gallons
   Cellulose Fiber
   Synthetic Fiber
   Diatomaceous Earth
   Zinc Oxide
   Sodium Silicate
   Phenolic Resin
   Synthetic Dispersant
   Antioxidant
2. Mix ingredients for 5-10 minutes until thoroughly dispersed.
3. Add mineral wool fiber.
   Add pigment color dispersion
   Add Carbon Black dispersion; mix for one minute, then pump entire slurry into the blend chest; and then dilute with fresh water to obtain a consistency of approximately 1.5% (pH 10.5).

(B) At blend chest, adjust slurry pH to 8.0-8.5 with dilute alum solution (12.5%).
1. Add diluted nitrile latex slowly while under good agitation, mix 3-5 minutes until thoroughly dispersed.
2. Add dilute cationic polyelectrolyte solution and mix in until slurry has sufficiently flocculated on fiber/filler matrix. Stock is now ready for web/sheet formation.

(C) At paper machine (direct flow cylinder machine, 1 vat)
1. At machine flow box add dilute solutions of:
   (a) Cationic polyelectrolyte
   (b) Anionic polyelectrolyte
   Feed these solutions to the stock flow continuously to obtain good formation and drainage.

(D) Form sheet on wet machine accumulator roll and remove after reaching desired thickness.

(E) After formation of desired sheet interleave with press fabric (synthetic) and platen press to desired density and thickness. % moisture after pressing is 55-65 (250-500 psi).

(F) Dry composite sheets in a tunnel dryer at air temperature of 200°-250° F. to obtain an out-of-dryer % moisture content of 2%.

(G) Condition sheets for 24 hours after drying to allow sheets to cool down, then calender to desired thickness, density and smoothness.

For the purpose of comparison, FIG. 1 shows creep relaxation vs temperature of the Example 1 material and a prior art asbestos gasket material. It must be appreciated that the lower the materials' percentage of creep relaxation, the better suited the material is for high temperature gasketing application.

The following chart compares several physical properties of the Example 1 material with those of a typical prior art asbestos gasketing material.

| Physical Properties Comp. | ASTM Test Method | GASKET Example #1 | DATA Typical |
|---|---|---|---|
| Reference Number | | | Asbestos Specs |
| Actual Gauge | | 0.033 | .029–.035 |
| Weight (lbs./msf) | | 205.2 | 200–300 |
| Density (lbs./ft. 3) | | 74.7 | 50–95 |
| Moisture (%) | | 0.3 | 3.0 max. |
| Tensile (PSI) MxC | F 152 | 1823 × 918 | 750 × 500 |
| % Compressibility | F 36-82 | 16.7 | 5-20 |
| Recovery (%) | F 36-82 | 57.5 | 40 min. |
| % Creep/Relaxation 300 F. | F-38-80 | 24.6 | 30 max. |
| Immersions @ 22 hrs. R.T. | | | |
| Fuel B | | | |
| Weight increase (%) | F 146 | 22.4 | 40 max. |
| Oil #3 | | | |
| Weight increase (%) | F 146 | 31.3 | 40 max. |
| Integrity-1200 F-24 hrs | | Passed | ok |
| Loss on Ignition @ | F 495-77 | 21.7 | 25 max. |
| Color: | | Natural | |

Notes:
C/R @ 5000 PSI, 1 lb. preload, .252 presserfoot
Immersions - 22 Hrs. @ RT
Ignition Loss = 1 Hr. @ 1500 F.

EXAMPLE II

This example illustrates the preparation of a non-asbestos compressible sheet material, usable for carburetor spacer gaskets, of the following composition.

| MATERIAL | % | 60# BATCH LBS. |
|---|---|---|
| Cellulosic Fiber | 0.6 | 0.96 |
| Synthetic Fiber | 1.2 | 1.94 |
| Clay | 13.7 | 21.99 |
| Diatomaceous Earth | 13.7 | 21.99 |
| Mineral Wool | 18.0 | 28.85 |
| Zinc Oxide | 0.3 | 0.48 |
| Sodium Silicate | 3.7 | 5.93 |
| Acrylate Latex | 6.0 | 9.61 |
| Alum | 5.0 | 8.01 |
| Anionic Polyelectrolyte | 0.2 | 0.32 |
| Cationic Polyelectrolyte | 0.2 | 0.32 |

(A) At Pulper
1. Add the following ingredients:
   Fresh Water—100 gallons
   Cellulose Fiber
   Synthetic Fiber
   Diatomaceous Earth
   Clay
   Zinc Oxide
   Sodium Silicate
2. Mix ingredients for 5–10 minutes until thoroughly dispersed.
3. Add mineral wool fiber.
   Add Carbon Black dispersion; mix for one minute, then pump entire slurry into the blend chest, and then dilute with fresh water to obtain a consistency of approximately 1.5% (pH 10.5).

(B) At blend chest, adjust slurry pH to 8.0–8.5 with dilute alum solution (12.5%).
1. Add diluted acrylate latex slowly while under good agitation, mix 3–5 minutes until thoroughly dispersed.
2. Add dilute cationic polyelectrolyte solution and mix in until slurry has sufficiently flocculated on fiber/filler matrix. Stock is now ready for web/sheet formation.

(C) At paper machine (direct flow cyliner machine, 1 vat).
1. At machine flow box add dilute solutiosn of:
   (a) Cationic polyelectrolyte
   (b) Anionic polyelectrolyte
   Feed these solutions to the stock flow continuously to obtain good formation and drainage.

(D) Form sheet on wet machine accumulator roll and remove after reaching desired thickness.

(E) After formation of desired sheet, interleave with press fabric (synthetic) and platen press to desired density and thickness. % moisture after pressing is 55-65 (250-500 psi).

(F) Dry composite sheets in a tunnel dryer at air temperature of 200°-250° F. to obtain an out-of-dryer % moisture content of 2%.

(G) Condition sheets for 24 hours after drying to allow sheets to cool down, then calender to desired thickness, density and smoothness.

The following chart compares the physical properties of the Example 2 material with those of a typical prior art asbestos gasketing material.

| Physical Properties Comp. | ASTM Test Method | GASKET Example #2 | DATA Typical |
|---|---|---|---|
| Reference Number | | | Asbestos Specs |
| Actual Gauge | | 0.121 | |
| Density (lbs./ft. 3) | | 67.0 | 60–70 |
| Moisture (%) | | 2.8 | 6.0 max. |
| Tensile (PSI) CMD | F 152 | 383 | 500 min |
| % Compressibility | F 36-82 | 15.1 | 10–20 |
| Recovery (%) | F 36-82 | 49.4 | 30 min. |
| Immersions @ 22 hrs. R.T. | | | |
| Fuel C | | | |
| Weight increase (%) | F 146 | 39.0 | 55 max. |
| Oil #3 | | | |
| Weight increase (%) | F 146 | 46.0 | 55 max. |
| | | Passed | ok |
| | F 495-77 | 37.4 | 40 max. |

Notes:
C/R @ 1000 PSI, 1 lb. preload, .252 presserfoot
Immersions - 22 Hrs. @ RT

EXAMPLE III

This example illustrates the preparation of a non-asbestos compressible sheet material, usable for high-temperature gaskets, of the following composition:

| MATERIAL | % | 60# BATCH LBS. |
|---|---|---|
| Cellulosic Fiber | 3.64 | 2.18 |
| Synthetic Fiber | 1.70 | 1.02 |
| Clay | 19.44 | 11.67 |
| Diatomaceous Earth | 19.44 | 11.67 |
| Sodium Silicate | 3.16 | 1.90 |
| Zinc Oxide | 0.972 | 0.58 |
| Antioxidant | 0.61 | 0.37 |
| Sulfur | 0.23 | 0.138 |
| Butyl zimate | 0.34 | 0.204 |
| Carbon Black | 0.64 | 0.384 |
| Mineral Wool | 26.73 | 16.0 |
| Nitrile Latex | 18.17 | 10.90 |
| Alum | 2.07 | 1.24 |
| Cationic Polyelectrolyte | 2.74 | 1.64 |
| Anionic Polyelectrolyte | 0.12 | 0.072 |

(A) At Pulper
1. Add the following ingredients:
   Fresh Water—100 gallons
   Cellulose Fiber Synthetic Fiber
Diatomaceous Earth
Zinc Oxide
Sodium Silicate
Sulfur Dispersion
Synthetic Dispersant
Antioxidant
Clay
Butyl Zimate 2. Mix ingredients for 5-10 minutes until thoroughly dispersed.
3. Add mineral wool fiber.
   Add pigment color dispersion.
   Add Carbon Black dispersion; mix for one minute, then pump entire slurry into the blend chest, and then dilute with fresh water to obtain a consistency of approximately 1.5% (pH 10.5).

(B) At blend chest, adjust slurry pH to 8.0-8.5 with dilute alum solution (12.5%).
1. Add diluted nitrile latex slowly while under good agitation, mix 3-5 minutes until thoroughly dispersed.
2. Add dilute cationic polyelectrolyte solution and mix in until slurry has sufficiently flocculated on fiber/filler matrix. Stock is now ready for web/sheet formation.

(C) At paper machine (direct flow cyliner machine, 1 vat).
1. At machine flow box add dilute solutions of:
   (a) Cationic polyelectrolyte
   (b) Anionic polyelectrolyte
   Feed these solutions to the stock flow continuously to obtain good formation and drainage.

(D) Form sheet on wet machine accumulator roll and remove after reaching desired thickness.

(E) After formation of desired sheet, interleave with press fabric (synthetic) and platen press to desired density and thickness. % moisture after pressing is 55-65 (250-500 psi).

(F) Dry composite sheets in a tunnel dryer at air temperature of 200°-250° F. to obtain an out-of-dryer % moisture content of 2%.

(G) Condition sheets for 24 hours after drying to allow sheets to cool down, then calender to desired thickness, density and smoothness.

The following chart compares several physical properties of the Example 3 material with those of a typical prior art asbestos gasketing material.

| Physical Properties Comp. | ASTM Test Method | GASKET Example #3 | DATA Typical |
|---|---|---|---|
| Reference Number | | | Asbestos Specs |
| Actual Gauge | | 0.030 | .029-.035 |
| Weight (lbs./msf) | | 222.7 | 200-300 |
| Density (lbs./ft. 3) | | 89.2 | 50-95 |
| Moisture (%) | | 1.3 | 3.0 max. |
| Tensile (PSI) MxC | F 152 | 1047 × 765 | 1000 min |
| % Compressibility | F 36-82 | 16.5 | 5-20 |
| Recovery (%) | F 36-82 | 48.7 | 40 min. |
| % Creep/Relaxation 300 F. | F-38-80 | 32.1 | 50 max. |
| Immersions @ 22 hrs. R.T. | | | |
| Fuel B | | | |
| Weight increase (%) Oil #3 | F 146 | 17.0 | 40 max. |
| Weight increase (%) | F 146 | 31.3 | 60 max. |
| Integrity-1200 F-24 hrs | | Passed | ok |

| Physical Properties Comp. | ASTM Test Method | GASKET Example #3 | DATA Typical |
|---|---|---|---|
| Loss on Ignition-@ | F-495-77 | 37.4 | 40 max. |

Notes:
C/R @ 5000 PSI, 5 lb. preload, .252 presserfoot
Immersions - 22 Hrs. @ RT
Ignition Loss - 1 Hr. @ 1500 F.

EXAMPLE IV

This example illustrates the preparation of a non-asbestos compressible sheet material, usable for high-temperature small engine head, heat exchanger, and exhaust gaskets, of the following composition:

| MATERIAL | % | LAB BATCH LBS. |
|---|---|---|
| Cellulosic Fiber | 0.987 | 0.6 |
| Synthetic Fiber | 1.97 | 1.2 |
| Diatomaceous Earth | 49.4 | 29.6 |
| Sodium Silicate | 7.82 | 4.7 |
| Zinc Oxide | 0.395 | 0.24 |
| Mineral Wool | 31.0 | 18.6 |
| Carbon Black | 0.35 | 0.21 |
| Alum | 1.13 | 0.68 |
| Nitrile Latex | 5.28 | 3.17 |
| Cationic Polyelectrolyte | 1.67 | 1.00 |
| Anionic Polyelectrolyte | .01 | .06 |

(A) At Pulper
1. Add the following ingredients:
   Fresh Water—100 gallons
   Cellulose Fiber
   Synthetic Fiber
   Diatomaceous Earth
   Zinc Oxide
   Sodium Silicate
2. Mix ingredients for 5-10 minutes until thoroughly dispersed.
3. Add mineral wool fiber.
   Add Carbon Black dispersion; mix for one minute, then pump entire slurry into the blend chest, and then dilute with fresh water to obtain a consistency of approximately 1.5% (pH 10.5).

(B) At blend chest, adjust slurry pH to 8.0-8.5 with dilute alum solution (12.5%).
1. Add diluted nitrile latex slowly while under good agitation, mix 3-5 minutes until thoroughly dispersed.
2. Add dilute cationic polyelectrolyte solution and mix in until slurry has sufficiently flocculated on fiber/filler matrix. Stock is now ready for web/sheet formation.

(C) At paper machine (direct flow cyliner machine, 1 vat).
1. At machine flow box add dilute solutions of:
   (a) Cationic polyelectrolyte
   (b) Anionic polyelectrolyte
   Feed these solutions to the stock flow continuously to obtain good formation and drainage.

(D) Form sheet on wet machine accumulator roll and remove after reaching desired thickness.

(E) After formation of desired sheet, interleave with press fabric (synthetic) and platen press to desired density and thickness. % moisture after pressing is 55-65 (250-500 psi).

(F) Dry composite sheets in a tunnel dryer at air temperature of 200°-250° F. to obtain an out-of-dryer % moisture content of 2%.

(G) Condition sheets for 24 hours after drying to allow sheets to cool down, then calender to desired thickness, density and smoothness.

Figure 2:
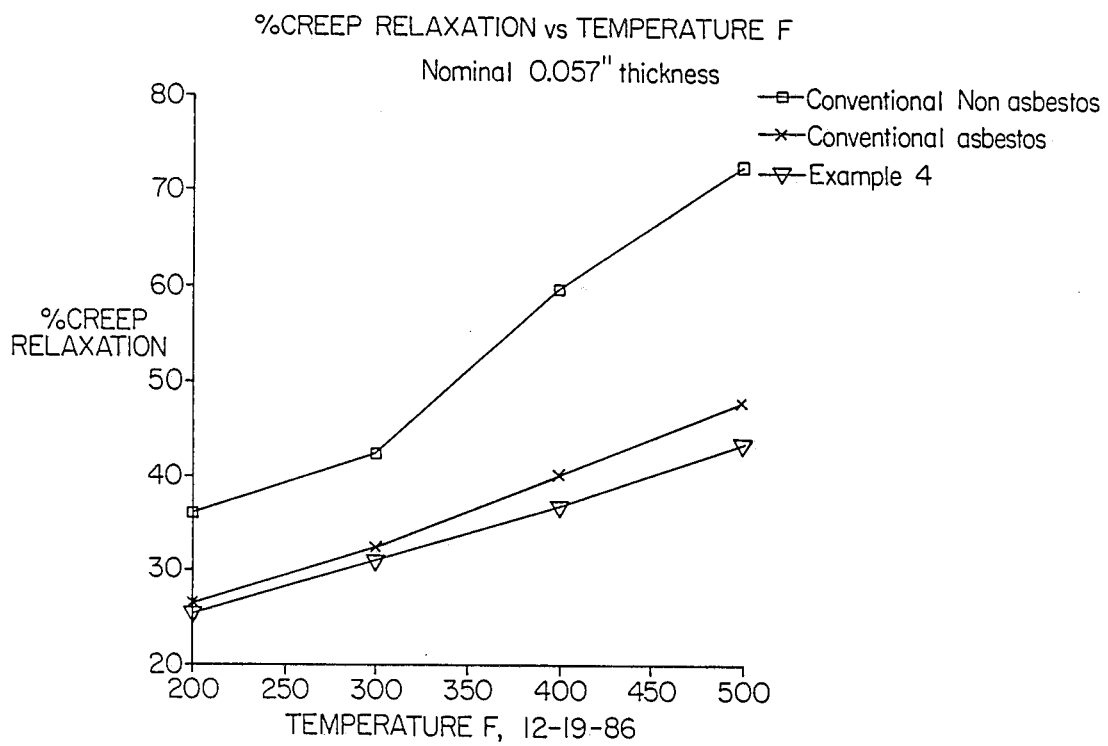
FIG. 2 is a graph showing creep relation vs temperature of the Example 4 material and prior art asbestos and non-asbestos materials.

For the purpose of comparison, FIG. 2 shows creep relaxation vs temperature of the Example 4 material and prior art asbestos and non-asbestos materials. Again, it must be appreciated that the lower the material's percentage of creep relaxation, the better suited the material is for high temperature gasketing applications.

The following chart compares several physical properties of the Example 4 material with those of a typical prior art asbestos gasketing material.

| Physical Properties Comp. | ASTM Test Method | GASKET Example #4 | DATA Typical |
|---|---|---|---|
| Reference Number | | | Asbestos Specs |
| Actual Gauge | | .056 | .055-.065 |
| Weight (lbs./msf) | | 427.2 | 350-450 |
| Density (lbs./ft. 3) | | 66.2 | 50-70 |
| Moisture (%) | | 1.0 | 3.0 max. |
| Tensile (PSI) MxC | F 152 | 1051 × 518 | 750 × 500 |
| % Compressibility | F 36-82 | 13.7 | 5-20 |
| Recovery (%) | F 36-82 | 60.3 | 40 min. |
| % Creep/Relaxation 300 F. | F-38-80 | 30.5 | 50 max. |
| Immersions @ 22 hrs. R.T. Fuel B | | | |
| Weight increase (%) Oil #3 | F 146 | 31.4 | 40 max. |
| Weight increase (%) | F 146 | 42.0 | 60 max. |
| Integrity-1200 F-24 hrs | | Passed | ok |
| Loss on Ignition @ | F 495-77 | 16.4 | 25 max. |
| Color: | | Natural | |

Notes:
C/R @ 1000 PSI, 1 lb. preload, .252 presserfoot
Immersions - 22 Hrs. @ RT
Ignition Loss - 1 Hr. @ 1500 F.

Although the foregoing examples describe presently preferred embodiments of the invention, it is understood that the invention may be practiced in still other forms within the scope of the following claims.

What is claimed is:

1. A compressible non-asbestos sheet material usable for high temperature gaskets, said material comprising:
   inorganic fibrous material,
   inorganic filler material,
   organic fibrous material, and
   a dual binder system, said dual binder system consisting of an organic binder material and an inorganic binder material.

2. The compressible non-asbestos high temperature gasket sheet material of claim 1 wherein said organic binder material is an organic elastomeric binder.

3. The compressible non-asbestos high temperature gasket sheet material of claim 1 wherein said inorganic binder material is selected from the group consisting of silicates and colloidal silica.

4. The compressible non-asbestos high temperature gasket sheet material of claim 3 wherein said inorganic binder material is sodium silicate.

5. The compressible non-asbestos high temperature gasket sheet material of claim 1 comprising:
   10-50% by weight of inorganic fibrous material,
   10-90% by weight of inorganic filler material,
   4-30% by weight of an organic material binder,
   2-10% by weight of an inorganic material binder,
   1-10% by weight of organic fibrous material.

6. The compressible non-asbestos high temperature gasket sheet material of claim 1, wherein said inorganic fibrous material is selected from the group consisting of mineral wool, ceramic fiber, glass fiber and mixtures thereof.

7. The compressible non-asbestos high temperature gasket sheet material of claim 1, wherein said inorganic filler material is selected from the group consisting of diatomaceous earth, clay, mica, vermiculite, barytes, and mixtures thereof.

8. The compressible non-asbestos high temperature gasket sheet material of claim 1, wherein said elastomeric organic binder is selected from the group consisting of isoprene rubber, styrene-butadiene rubber, nitrile rubber, chloroprene rubber, silicone rubber, acrylic rubber, fluorinated resins and mixtures thereof.

9. The compressible non-asbestos high temperature gasket sheet material of claim 1, wherein said elastomeric organic binder is in latex form.

10. The compressible high temperature non-asbestos gasket sheet material of claim 1, wherein said organic fibrous material is selected from a group consisting of cellulosic fibers, synthetic fibers, and mixtures thereof.

11. The compressible high temperature non-asbestos gasket sheet material of claim 10, wherein said synthetic fibers are aramid fibers.

12. The compressible non-asbestos high temperature gasket sheet material of claim 1 comprising:
   18-31% by weight of inorganic fibrous material,
   27-50% by weight of inorganic filler material,
   5-19% by weight of an organic material binder,
   3-8% by weight of an inorganic material binder,
   1.0-6.0% by weight of an organic fibrous material.

* * * * *